(12) United States Patent
O'Connell et al.

(10) Patent No.: US 6,661,787 B1
(45) Date of Patent: Dec. 9, 2003

(54) INTEGRATED DATA TABLE IN A NETWORK

(75) Inventors: Anne G. O'Connell, Dublin (IE);
Eugene O'Neill, Dublin (IE); Una Quinlan, Dublin (IE)

(73) Assignee: 3Com Technologies, Georgetown, KY (US)

(*) Notice: Subject to any disclaimer, the term of this patent is extended or adjusted under 35 U.S.C. 154(b) by 0 days.

(21) Appl. No.: 09/286,470

(22) Filed: Apr. 6, 1999

(30) Foreign Application Priority Data

May 21, 1998 (GB) .............................................. 9810843

(51) Int. Cl.$^7$ .............................................. H04L 12/56
(52) U.S. Cl. ........................ 370/389; 370/401; 370/424
(58) Field of Search ................................ 370/389, 390, 370/392, 397, 398, 399, 401, 402, 409, 425, 426, 428; 709/238

(56) References Cited

U.S. PATENT DOCUMENTS

| | | | |
|---|---|---|---|
| 4,780,889 A | | 10/1988 | Ley et al. |
| 5,550,860 A | | 8/1996 | Georgiou et al. |
| 5,642,386 A | | 6/1997 | Rocco, Jr. |
| 5,757,297 A | | 5/1998 | Ferraiolo et al. |
| 5,815,500 A | * | 9/1998 | Murono ...................... 370/401 |
| 5,950,115 A | | 9/1999 | Momtaz et al. |
| 5,970,103 A | | 10/1999 | Townshend |
| 5,978,951 A | * | 11/1999 | Lawler et al. ............... 714/758 |
| 6,161,144 A | * | 12/2000 | Michels et al. ............. 709/238 |
| 6,308,220 B1 | * | 10/2001 | Mathur ....................... 709/238 |

FOREIGN PATENT DOCUMENTS

| | | |
|---|---|---|
| EP | 0 153 107 | 8/1985 |
| EP | 0365337 A2 | 4/1990 |
| EP | 0 424 741 | 5/1991 |
| EP | 0465201 A2 | 1/1992 |
| EP | 0508886 A1 | 10/1992 |
| EP | 0841782 A1 | 11/1997 |
| GB | 2283645 A | 5/1995 |
| GB | 2 336 075 | 10/1999 |
| GB | 2 337 674 | 11/1999 |
| GB | 2 343 816 | 5/2000 |
| GB | 2 344 030 | 5/2000 |
| WO | WO 96/34474 | 10/1996 |

OTHER PUBLICATIONS

WPI Abstract Accession No. 97–269820/199724 & JP090098171 (Hitachi) Apr. 8. 1997.
WPI Abstract Accession No. 93–390998/199349 & JP050292091 (Mitsubishi Electric) Nov. 5, 1993.
Copending Application No. 09/417,102 filed Oct. 13, 1999.
Copending Application No. 09/253,538 filed Feb. 22, 1999.
Copending Application No. 09/645,569 filed Aug. 25, 2000.

* cited by examiner

*Primary Examiner*—Alpus H. Hsu
*Assistant Examiner*—Thien Tran
(74) *Attorney, Agent, or Firm*—Nixon & Vanderhye, P.C.

(57) ABSTRACT

A method of operating a network device in a communication system for the transmission of data packets which include network addresses identifying sources and destinations of data, the network device being capable of both bridging and routing decisions and including a forwarding database by means of which a packet including network address data can be forwarded to at least one port and thereby to at least one network path identified by a network address, and packets can be forwarded to at least one port in response to a media access control address. The method comprises establishing a data table which contains entries comprising a network address of an end station to which a packet is destined, a respective media access control address and an identification of at least one port to which the packet will be directed within the device. The table is accessed in response to network addresses and media access control addresses, whereby the same table can be used for both routing and bridging decisions.

9 Claims, 5 Drawing Sheets

ROUTING TABLE

| MAC | IP | VLAN | PortMask |
|-----|----|----|----------|
|     |    |      |          |
|     |    |      |          |

BRIDGING TABLE

| MAC | VLAN | PortMask | Age |
|-----|------|----------|-----|
|     |      |          |     |
|     |      |          |     |

ARP CACHE

| MAC | IP |
|-----|-----|
|     |     |
|     |     |

FIG. 2

INTEGRATED DATA TABLE IN A NETWORK

BACKGROUND OF THE INVENTION

1. Field of the Invention

The present invention relates to the storage of data in network devices for packet-based data communication systems wherein data is transmitted in data packets that include headers containing address data by means of which packets are switched or routed to their ultimate destinations.

2. Description of Related Art

Address data in data packets fall into two broad categories. A first category is conventionally termed 'network addresses' and relates to the source and intended destination network of a packet. These are 'layer 3' addresses in the customary OSI layering model. A second category is termed 'media access control' address data, abbreviated to MAC addresses. These addresses, layer 2 addresses in the OSI model, relate to the devices within the communication system and are used by network devices to perform bridging.

Two common network devices are called routers and bridges. They both comprise a multiplicity of ports, a switching function (usually constituted by an application-specific integrated circuit or ASIC) and a forwarding database. The latter is compiled by reading 'source' addresses from incoming packets and storing them in a table along with an identification of the respective port on which the packet was received. Such a table is used by a look-up engine to determine a port from which to dispatch a packet having a 'destination' address corresponding to a 'source' address in the table. As will be seen, such 'source' and 'destination' address may be addresses in either of the aforementioned categories.

If the device receives a packet of which the destination address is not in the look-up table (the forwarding database) it is necessary to broadcast the packet so that an acknowledgement from the destination can be used to resolve the address. Since the broadcast of packets consumes substantial bandwidth (i.e. information-carrying capacity) it is known to partition networks into sub-nets or virtual local area networks (VLANs) whereby the broadcast of packets can be limited to one VLAN.

Both bridges and routers customarily include various buffering, contention resolution and flow control functions which are well known to those skilled in the art and which will not be described further herein. Both bridges and routers and related concepts, such as sub-nets, VLAN's etc, are well described in the prior art, such as WO96/34474, GB-A-2283645, U.S. Pat. No. 5,027,350 and EP-A-0841782.

However, bridges and routers (which terms are used to denote the respective functions, since devices which perform both functions are available) enable somewhat different functions. Routers, as the name implies, are used to look up a route to another network or sub-network. They make a decision which answers the question: 'To which network should the packet be sent?'. For this purpose the forwarding database needs to relate an identification of the subnet, via a network address sometimes termed VLAN address, and an identification, conveniently termed a port mask, of the port to which the sub-net is directly or indirectly connected. In general, a router does not need knowledge of an end station address in its forwarding database. If however a router has to direct a packet to an end station in a directly connected sub-net the router needs to map the network address of the end station to its MAC address, and to place the MAC address on the packet as the packet leaves the router. To enable this mapping, the router has recourse to a table known as an ARP (address resolution protocol) cache, by means of which a record is maintained of mappings between network addresses, such as IP (internet protocol) addresses, and media access control addresses.

Where a routing table constitutes an end station cache (in particular to achieve fast look-up) the storage space required is $X(m+i+v+p)$, where X is the maximum number of entries in the table, m is the number of bits in an MAC address, i is the number of bits in a network or IP address, v is the number of bits in VLAN address, and p is the number of bits in a port mask. Typically, $m=48$, $i=32$, $v=5$ and $p=32$. The storage capacity required of an ARP cache is $X(m+i)$, the symbols in this expression having the meanings already indicated.

A bridge is used to connect one LAN to another, so that users connected to different LANs can communicate as if they were on the same LAN. For this purpose the bridge merely switches packets from one port to another. It responds to a MAC address and a VLAN address to look up the relevant port mask.

It is customary (as described in for example EP-A-0365337) to include in a bridging table an 'age' field which is constituted by the value of an artificial age at the time the entry was made. The artificial age may be changed from time to time in an alternating or cyclic sequence. The interval between changes may be selected or adapted to the data traffic flow. The age field enables the clearing of unwanted 'old' entries from the table in a single operation, the entries which have an age field not corresponding to a current age being removed from the table.

The storage required for a bridging table is $X(m+v+p+a)$ where X, m, v, and p relate to the number of entries, the MAC address, the VLAN address and the port mask respectively. The age field a may be one or two bits.

SUMMARY OF THE INVENTION

The present invention is particularly concerned with the management of data storage for a device which can function both as a router and a bridge. It may be seen from the foregoing that a simple combination of the ordinary functions of a router and bridge would require data storage corresponding to $X(3m+2i+2v+2p+a)$, both bridges and routers require for their operation response to MAC addresses and in addition a router needs to map between network addresses and MAC addresses.

The basis of the present invention is the use of an address cache which is based on network addresses of end stations. An address cache thus organised may be constituted by a single data table and will, as the following indicates, greatly reduce the storage requirements for separate routing and bridging functions.

In order to access such an 'integrated' cache, the device needs to be able to respond to both MAC (layer 2) addresses and network (layer 3) addresses and a further aspect of the invention is a process which enables the device to act in such a manner.

DETAILED DESCRIPTION OF THE DRAWINGS

FIG. 2 illustrates separately organised routing and bridging tables and an ARP cache;

DETAILED DESCRIPTION OF EXEMPLARY EMBODIMENTS OF THE INVENTION

Figure 1:
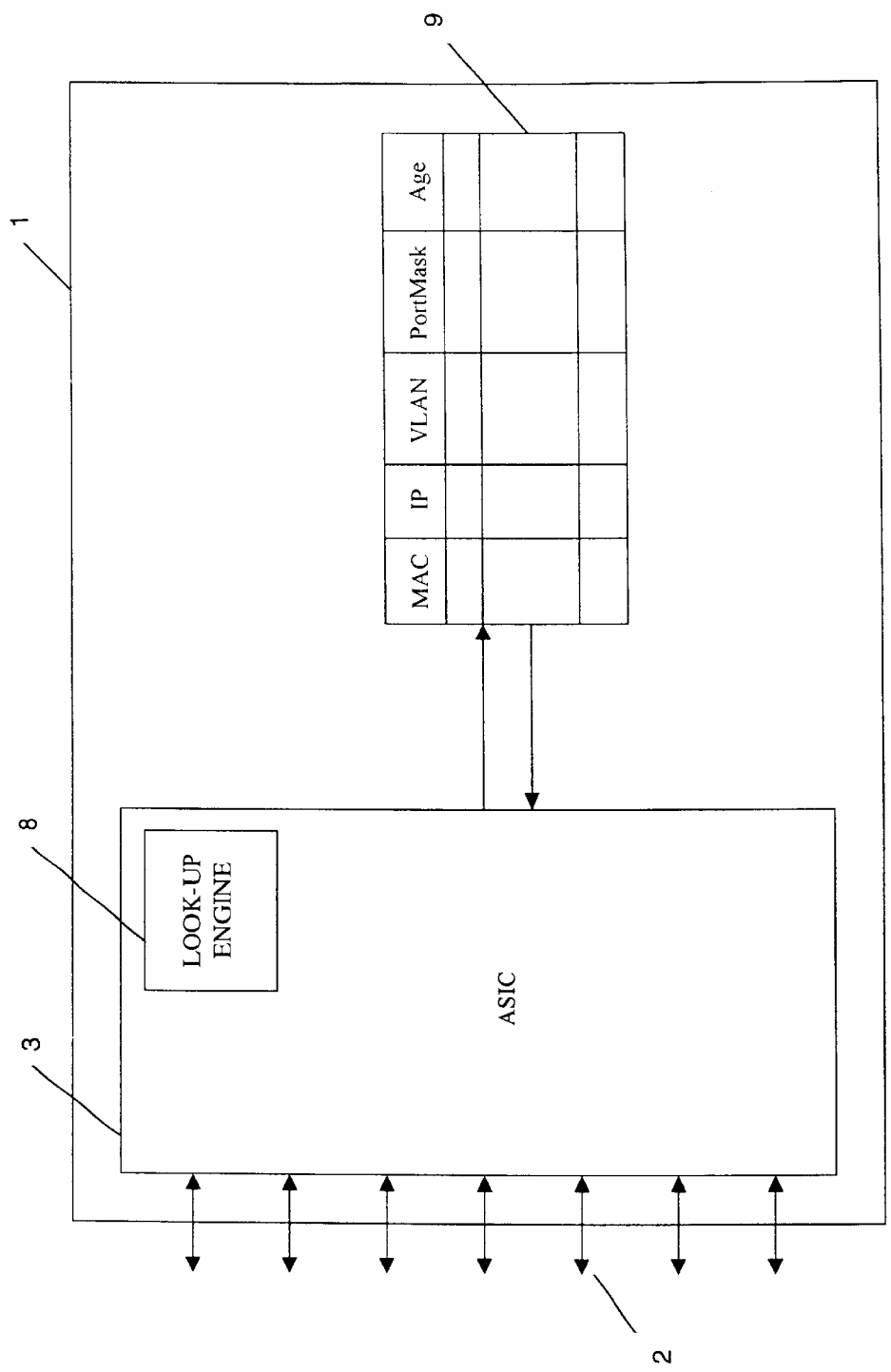
FIG. 1 illustrates a network device including a combined table according to the invention.

FIG. 1 of the drawings illustrates a network device 1 which can perform both as a bridge and a router. Most of the functions of the device are common to known devices and therefore need no detailed description. For example, EP-A-0841782 describes a level-3 network switch which is capable of both routing and bridging functions, and comprises a separate ARP cache and MAC address look-up table.

The device 1 includes a multiplicity of ports 2 connected by way of lines or links to other network devices (not shown). Data packets received at the ports 2 include address and other data which is read by operation of an ASIC 3 while the packets are temporarily stored in a buffer (not explicitly shown) pending dispatch on a port or ports. In particular the device includes a forwarding database which contains entries relating source data of an incoming packet and the port on which the packet was received. The port on which a packet is to be dispatched is obtained by means of a look-up engine 8 which attempts to locate a match between the destination data of a packet and source data in the table. If no match be found, it is generally necessary to broadcast the packet. The source data and destination data required for the forwarding database differ according as the device acts as a bridge or a router.

It may be remarked that it is customary to employ a hashing algorithm on address data to access a look-up table. The use of hashing is described in the above-mentioned U.S. Pat. No. 5,027,350 to Marshall, issued Jun. 25, 1991, and need not be described herein.

Before the remainder of FIG. 1 is described, reference will be made to FIG. 2, which illustrates three types of databases used in routers or bridges according to the state of the art. Reference 5 denotes a routing table typically containing X entries, each of which consists of an MAC address, an IP address, a VLAN address and a port mask. Such a table is employed to store MAC addresses that the device has previously obtained and to forward unicast packets to such addresses.

The reference 6 denotes, a bridging table containing entries each comprising an MAC address, a VLAN address, a port mask and an age field.

The reference 7 illustrates an ARP (address resolution protocol) cache, comprising MAC addresses and network (IP) addresses, needed for the mapping discussed above. The use of an ARP cache is described in the aforementioned EP-A-0841782.

Reverting now to FIG. 1, which illustrates a network device intended for routing and bridging, the device includes an integrated address cache 9 in place of the separate routing and bridging tables 5 and 6 and ARP cache as shown in FIG. 1. The single address cache 9 can hold a multiplicity of entries each comprising an address cache 9 according to the invention disposed within the device a MAC address, a network (IP) address, a VLAN address, a port mask and, preferably, an age field.

The address cache may be accessed (by means of hashing if desired) from either a network address or a MAC address within a received packet.

It may be observed that the storage required for X entries in a table according to FIG. 1 is X(m+i+v+p+a) compared with X(3m+2i+2v+2p+a), the storage required for bridging and routing functions based on an MAC address cache with a mapping of address resolution protocol mappings as may be required for the router. There is accordingly a substantial saving in storage requirements.

FIG. 1 illustrates only the switching ASIC (with look-up) and the associated data table which includes the layer 2 and layer 3 (and other) data. Since look-ups using either layer 2 addresses or layer 3 addresses will be required, the present embodiment employs two hash tables, one of which is accessed by hashing the relevant MAC address and VLAN number of an incoming packet, the other being accessed using the relevant IP address of the incoming packet. The device needs to make a prior decision, as described below, on which look-up it should perform. Before the relevant processes are described, reference should be first made to FIG. 3, which illustrates a specific example of hash tables and an associated data table 9.

Figure 3:
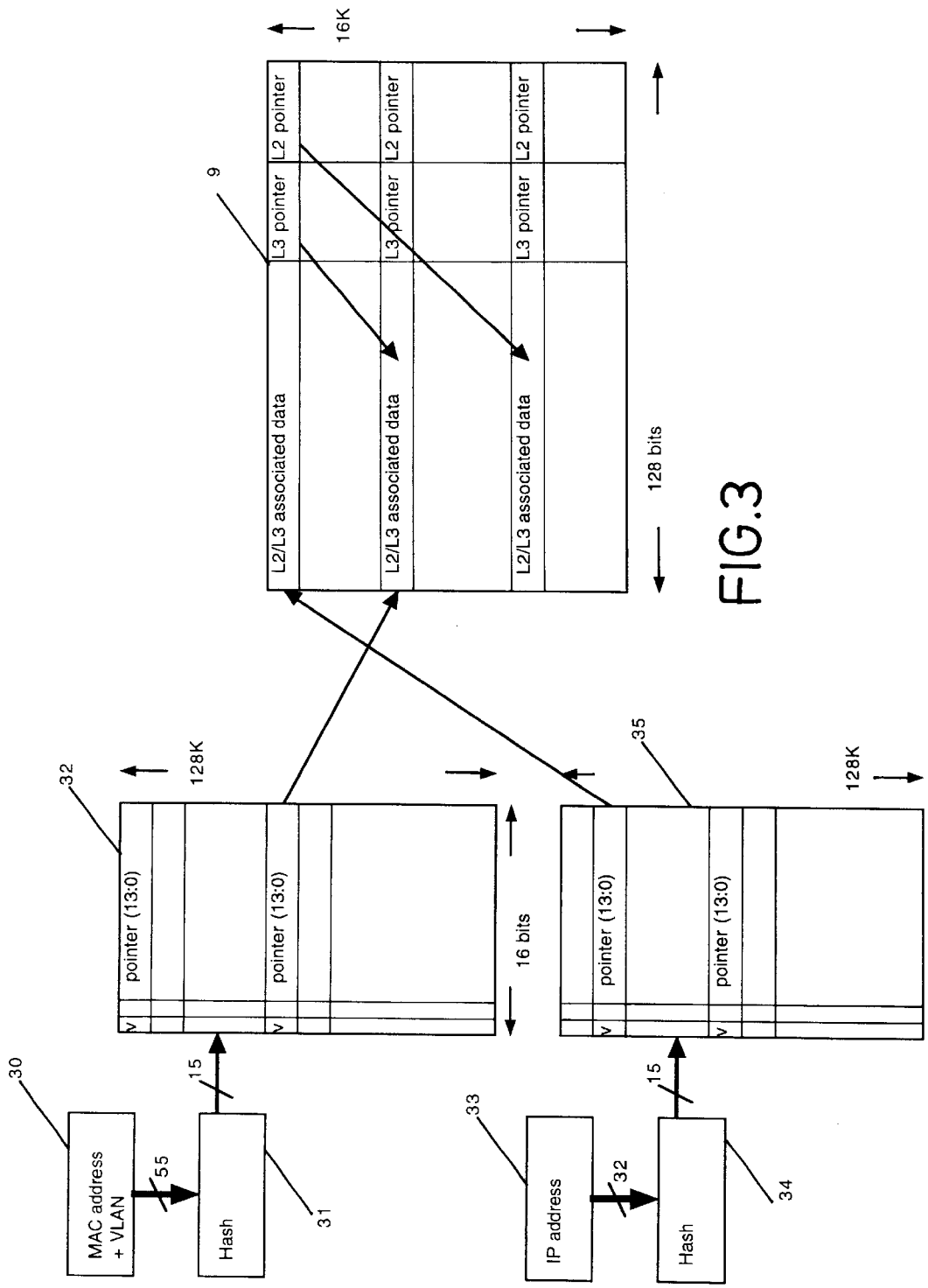
FIG. 3 illustrates hash tables and a combined table in more detail.

In FIG. 3, the MAC address and VLAN number of an incoming packet are represented by block 30, and are constituted by a 55-bit wide word input to a hash function 31 which hashes the combined MAC/VLAN address to a 15-bit wide word accessing first hash table 32. Each entry in the hash table is 16 bits wide. Bit 15 of each entry indicates, if '1', that there is a valid entry, if bit 15 is '0' the table entry is empty. In this example bit 14 is unused. Bits [13:0] constitute a pointer to an entry in the associated data table 9.

Similarly, an IP address is represented by block 33 and constituted by a 32-bit wide input to a hashing function 34, which hashes the IP address to a 15-bit wide entry for second hash table 35. This is organised similarly to table 32. In this example the tables 32 and 35 can contain 128K entries.

The associated data table 9 may be constituted by a single internal DRAM block, with two interleaved banks capable of supporting 16K layer 2 and 16K layer 3 addresses.

If an entry in table 9 is a unicast entry (as shown in simplified form in FIG. 3), it may be defined as follows:

Bit 127 is unused. Bits 126:79 are a MAC address. Bits 78:47 are an IP address. Bits 47:39 are a VLAN number. Bits 38:34 are a destination port number. Bit 33 is an age bit. Bit 32 is a 'perm' bit. Bits 31:28 are miscellaneous utility bits. Bits 27:14 constitute a layer 3 link pointer (to the next entry in a chain). Bits 13:0 constitute a layer 2 link pointer. The use of link pointers in tables accessed by way of a hashing process is well known and need not be described in detail.

The table 9 may also support a multicast entry which may be defined as follows:

Bits 127:101 are unused. Bits 100:54 constitute a MAC address. Bits 53:46 constitute a VLAN address. Bit 45 is an age bit. Bit 44 is a 'perm' bit. Bits 43:18 are a destination bit mask. Bits 17:14 are miscellaneous utility bits. Bits 13:0 constitute a layer 2 link pointer.

Figure 4:
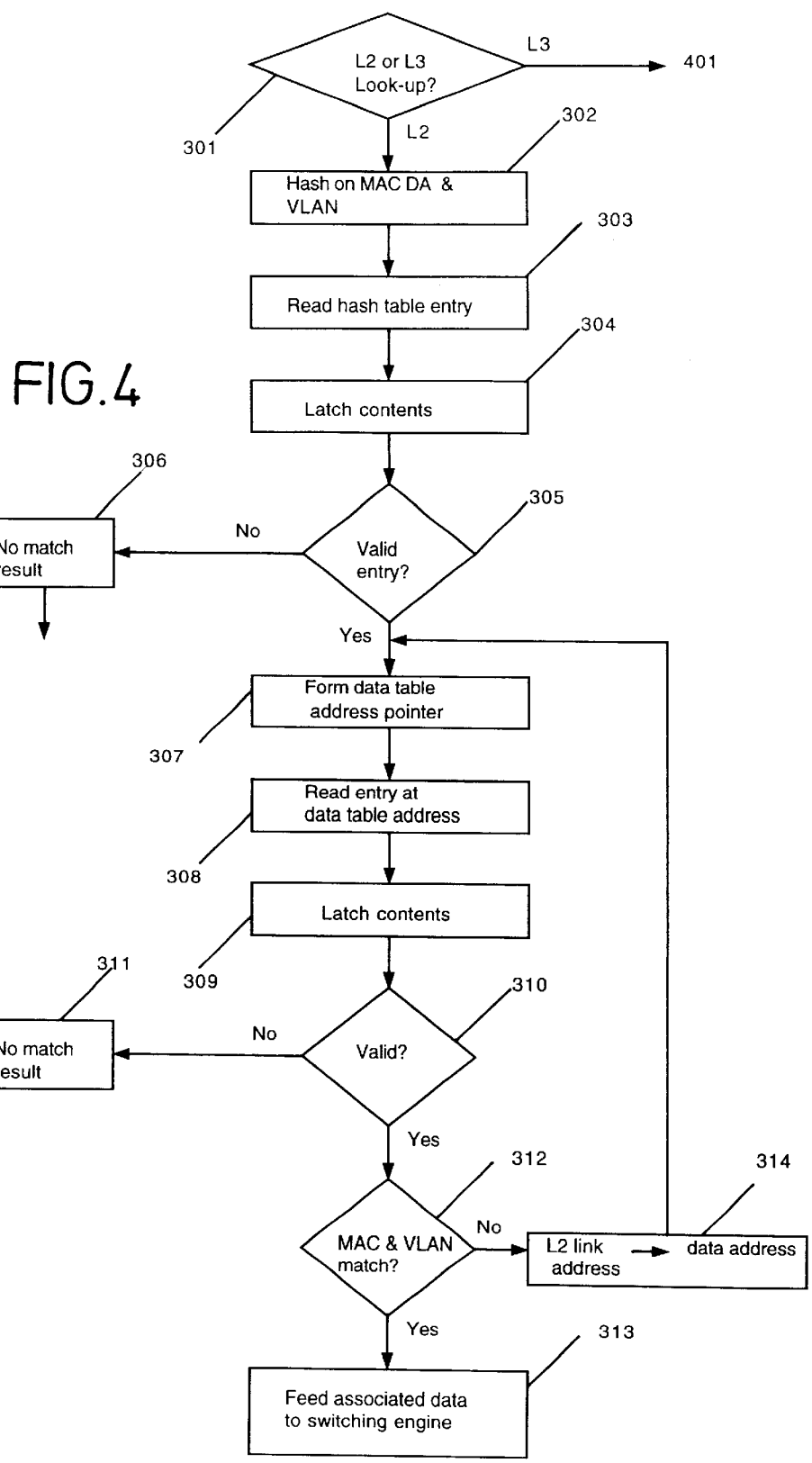
FIG. 4 illustrates a first look-up process using 'layer 2' addresses.
Figure 5:
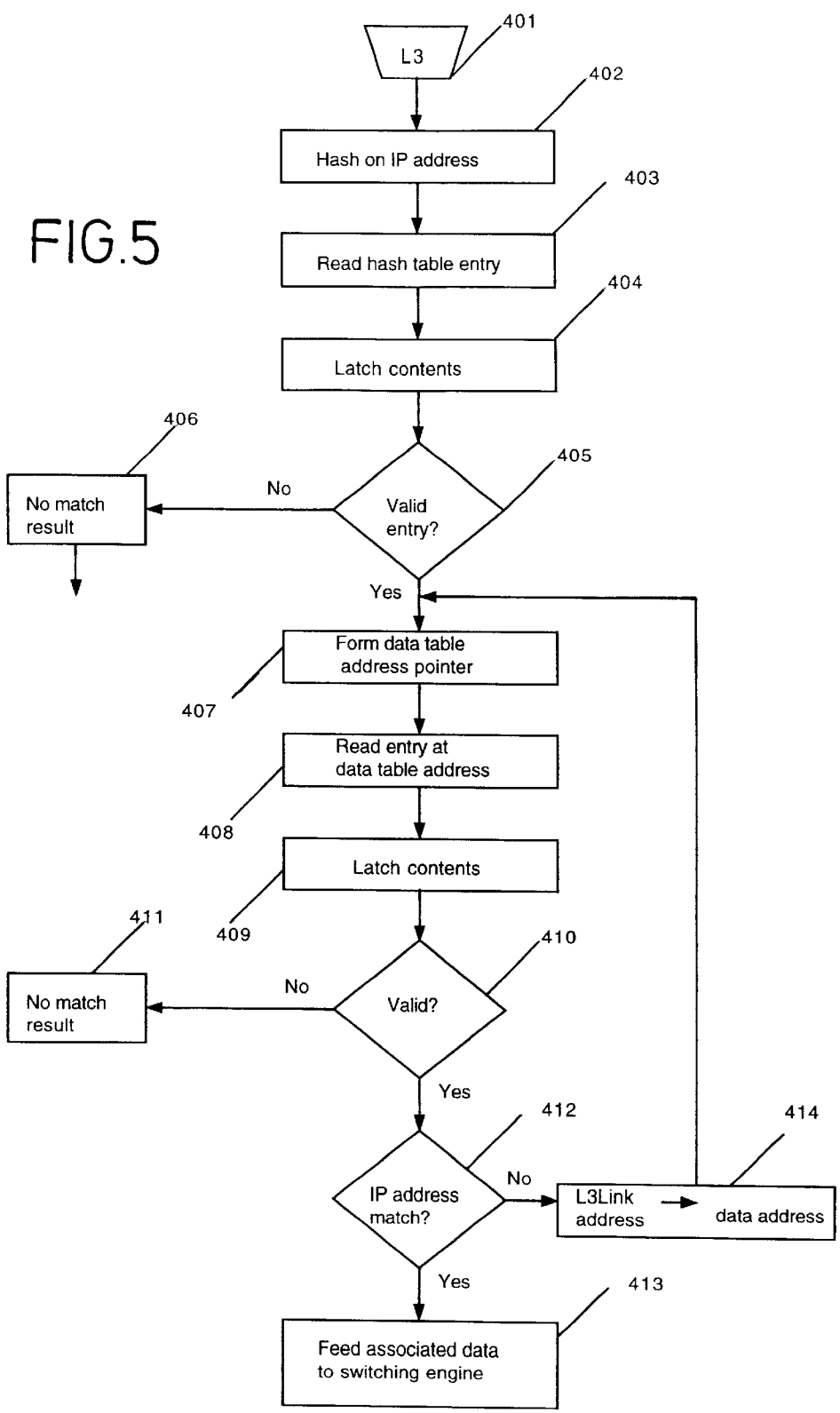
FIG. 5 illustrates a second look-up process using 'layer 3' addresses.

FIGS. 4 and 5 illustrate the look-up processes which the device may be required to perform. FIG. 4 illustrates the layer 2 (MAC) look-up process, of which the first stage 301 is a decision whether a layer 2 or a layer 3 look-up should be performed.

In the present example, it is assumed for the sake of simplicity that no VLANs are used in layer 3 decisions, there is no multicast routing support and the layer 3 addresses that can be looked up are all of one type (herein called IP). The processes shown in FIGS. 3 and 4 can readily be adapted to more complex requirements.

A layer 3 decision in the present example requires the MAC address to be within a specified range, for the packet type to be IP, and for the checksum (the redundancy data at the end of the packet) to indicate a valid packet, i.e. not containing errors. A decision tree in these circumstances would be:

If MAC (destination address) is within local range of MAC addresses
    then if packet type is not IP, then bridge
    if bad check sum, discard (or send to CPU)
        else (good IP)
            do layer 3 look-up
                if no match found, use cached associated data
                else
            send to CPU
    else (MAC destination address not matching port destination address)
    bridge The foregoing decision process represents stage 301 in FIG. 4. If the decision is to perform a layer 3 look-up, the process shifts to FIG. 5 to be described later. If there is to be a layer 2 look-up, then there is the performance of a hash on the MAC destination address and the VLAN number as shown at stage 302. This enables a reading of the entry in the hash table 32. The contents of the entry are latched (stage 304). The contents of that entry comprises, as indicated above, a bit indicating the validity of the data entry and a pointer to the associated data table. If the valid/invalid bit indicates no matching result (stage 306) the look-up has failed (but may be followed by a learning cycle). On the assumption that the latched contents of the entry indicates a valid entry, a data table address pointer may be formed (stage 307) from a base pointer and the pointer from the latched hash table entry. The relevant data table entry is read (stage 308) and the contents of that entry are latched (stage 309). There may at this stage be a validity test (stage 310); if the contents are not valid (stage 311) then the look-up process ceases, but may be followed by a learning cycle (not shown).

It is now necessary to test (stage 312) whether the MAC address and the VLAN number in the incoming packet correspond to the MAC address and VLAN number indicated in the read entry from the associated data table. If there is such a match, stage 313, the associated data (such as the destination port) are fed to the switching engine of the ASIC (stage 315) and the packet can be forwarded to the port indicated thereby.

If the test for identity of MAC address and VLAN number, the layer 2 link address pointer (stage 314) allows an examination of the entry at the next table address in the chain and identified by the link pointer, so that steps 307 onwards are performed until either a match is found or the chain of linked addresses is exhausted.

FIG. 5 illustrates the layer 3 look-up process. Stage 401 represents a decision to perform the layer 3 look-up. Stage 402 is the hashing of the IP address by hash function 34 in FIG. 3. Stage 403 is a reading of the hash entry in table 35. The contents of that entry are latched (stage 404). The latched data is constituted by a valid/invalid bit and an address pointer. Stage 405 is the testing of bit 15 for a valid entry. If the entry is invalid the look-up process terminates (stage 406), but may be followed by a learning process. If the entry is valid, then an address pointer for the associated data table is formed (stage 407), using the read pointer and an offset (if required). The relevant entry in the data table is read (stage 408) and the contents are latched (stage 409). If the latched contents are invalid (stage 410) the look-up process terminates (stage 411). If the latched contents are valid, then a check is made (stage 412) on whether the IP address of the packet corresponds to the IP address read from the latched table entry. If a match is found, the associated data in the entry of the associated data table are fed out to the switching engine (stage 413). If there is no match, then the link pointer is used to cause examination of the next linked entry in the chain (stage 414).

The foregoing is therefore an example of a network device which is capable of both routing and bridging decisions using a single integrated data table which efficiently includes network addresses and media access control addresses, together with, in this example, VLAN numbers, and the relevant associated data.

What is claimed is:

1. A method of operating a network device in a communication system for the transmission of data packets which include network addresses identifying sources and destinations of data, the network device being capable of both bridging and routing decisions and including a forwarding database by means of which a packet including network address data can be forwarded to at least one port and thereby to at least one network path identified by a network address, and packets can be forwarded to at least one port in response to a media access control address, the method comprising:

establishing a data table which contains entries each comprising a destination network address of an end station to which a packet is destined, a respective media access control address and an identification of at least one port to which the packet will be directed within the device;

determining whether to access said data table to retrieve said identification on the basis of a destination media access control address in a received packet or on the basis of a destination network address in said packet; and accessing said data table in response to either said destination network address or said destination media access control address in dependence on the determination whether to access said data table to retrieve said identification on the basis of the destination media access control address or the destination network address, whereby the same table can be used for both routing and bridging decisions.

2. A method according to claim 1 wherein determining whether to access said data table to retrieve said identification on the basis of the destination media access control address or the destination network address comprises:

determining whether said destination media access control address is within a specified range;

and said accessing said data table in response to either said destination network address or said destination media control address comprises performing a look-up in said data table to retrieve said identification on the basis of said destination media access control address in said received packet when said destination media access control address falls within said range; and performing a look up in said data table on the basis of said destination network address of said packet when said destination media access control address is outside said range.

3. A method of operating a network device in a communication system for the transmission of data packets which include network addresses identifying sources and destinations of data, the network device being capable of both bridging and routing decisions and including a forwarding database by means of which a packet including network address data can be forwarded to at least one port and thereby to at least one network path identified by a network address, and packets can be forwarded to at least one port in response to a media access control address, the method comprising:

establishing a data table which contains entries each comprising a destination network address of an end station to which a packet is destined, a respective media access control address and an identification of at least one port to which the packet will be directed within the device;

determining whether to access said data table to retrieve said identification on the basis of a destination media access control address in a received packet or on the basis of a destination network address in said packet; and accessing said data table in response to either said destination network address or said destination media access control address in dependence on the determination whether to access said data table to retrieve said identification on the basis of the destination media access control address or the destination network address, whereby the same table can be used for both routing and bridging decisions;

wherein determining whether to access said data table to retrieve said identification on the basis of the destination media access control address or the destination network address comprises:

determining whether said destination media access control address is within a specified range;

said accessing said data table in response to either said destination network address or said destination media control address comprises performing a look-up in said data table to retrieve said identification on the basis of said destination media access control address in said received packet when said destination media access control address falls within said range; and performing a lookup in said data table on the basis of said destination network address of said packet when said destination media access control address is outside said range; and each entry in said data table includes a VLAN number and wherein the look-up in said data table on the basis of said destination media access control comprises accessing the table in response to both the said destination media access control address and a VLAN number.

4. A method according to claim 1 wherein the accessing step comprises a hashing step to convert address data to a pointer to an address in said data table.

5. A network device for use in a communication system for the transmission of data packets which include network addresses and/or media access control addresses, the network device being capable of bridging decisions in response to media access control addresses and routing decisions in response to network addresses, said device including a multiplicity of ports for receiving and forwarding data packets and a data table for entries each comprising destination address data and an identification of a port, whereby an incoming packet can be examined for its destination address data and be forwarded from the device on the port associated with the respective destination address data, wherein said data table is organised to contain entries each including a destination network address, a media access control address and port identification data; and said device includes:

means for making a decision whether to access said data table and to retrieve an identification of said port on the basis of either a destination network address or a destination media access control address in said incoming packet; and means for accessing said data table in response to either said destination network address or said destination media access control address in accordance with said decision.

6. A device according to claim 5 wherein the means for accessing comprises two hash tables each containing entries each pointing to an address in said data table and further comprises means for hashing address data comprising a destination network address to access a first of the hash tables and means for hashing address data including a destination media access control address to access a second of the hash tables.

7. A network device for use in a communication system for the transmission of data packets which include network addresses and/or media access control addresses, the network device being capable of bridging decisions in response to media access control addresses and routing decisions in response to network addresses, said device including a multiplicity of ports for receiving and forwarding data packets and a data table for entries each comprising destination address data and an identification of a port, whereby an incoming packet can be examined for its destination address data and be forwarded from the device on the port associated with the respective destination address data, wherein said data table is organised to contain entries each including a destination network address, a media access control address and port identification data; and said device includes:

means for making a decision whether to access said data table and to retrieve an identification of said port on the basis of either a destination network address or a destination media access control address in said incoming packet;

means for accessing said data table in response to either said destination network address or said destination media access control address in accordance with said decision;

wherein the means for accessing comprises two hash tables each containing entries each pointing to an address in said data table and further comprises means for hashing address data comprising a destination network address to access a first of the hash tables and means for hashing address data including a destination media access control address to access a second of the hash tables; and each of the entries in the data table includes a VLAN number and the said means for hashing address data comprising a destination media access control address hashes address data including a VLAN number.

8. A method of operating a network device in a communication system for the transmission of data packets which include network addresses identifying sources and destinations of data, the network device being capable of both bridging and routing decisions and including a forwarding database by means of which a packet including network address data can be forwarded to at least one port and thereby to at least one network path identified by a network address, and packets can be forwarded to at least one port in response to a media access control address, the method comprising:

establishing a data table which contains entries each comprising a destination network address of an end station to which a packet is destined, a respective media access control address and an identification of at least one port to which the packet will be directed within the device;

determining in respect of a received packet whether said received packet can be bridged on the basis of a destination media access control address in said received packet;

consequent on a determination that said received packet can be bridged, matching said destination media access control address to a respective media access control address in one of said entries and thereby identifying said at least one port for the forwarding of the received packet; and consequent on a determination that said received packet cannot be bridged on the basis of said media access control destination address in said received packet, matching a network destination address in said received packet with a network address in one of said entries and thereby identifying a port for the forwarding of said received packet, whereby the same table is used for both routing and bridging decisions.

9. A network device for use in a communication system for the transmission of data packets which include network addresses and/or media access control addresses, the network device being capable of bridging decisions in response to media access control addresses and routing decisions in response to network addresses, said device including:

a multiplicity of ports for receiving and forwarding data packets; and a data table for entries each comprising destination address data and an identification of a port, whereby an incoming packet can be examined for its destination address data and be forwarded from the device on the port associated with the respective destination address data, wherein said data table is organised to contain entries each including a destination network address, a respective destination media access control address and port identification data; and said device includes:
 a look-up engine organized for:
  (i) determining in respect of a received packet whether said received packet can be bridged on the basis of a media access control destination address in said received packet;
  (ii) consequent on a determination that said received packet can be bridged, matching said destination media access control address to a respective media access control address in one of said entries and thereby identifying said at least one port for the forwarding of said received packet; and
  (iii) consequent on a determination that said received packet cannot be bridged on the basis of said destination media access control address in said received packet, matching a destination network address in said received packet with a network address in one of said entries and thereby identifying a port for the forwarding of said received packet.

* * * * *